US005471195A

United States Patent [19]

Rickman

[11] Patent Number: 5,471,195

[45] Date of Patent: Nov. 28, 1995

[54] DIRECTION-SENSING ACOUSTIC GLASS BREAK DETECTING SYSTEM

[75] Inventor: Stephen A. Rickman, Loomis, Calif.

[73] Assignee: C & K Systems, Inc., Folsom, Calif.

[21] Appl. No.: 243,205

[22] Filed: May 16, 1994

[51] Int. Cl.[6] .............................. G08B 13/00; H04B 3/00

[52] U.S. Cl. .......................... 340/550; 340/566; 340/541; 381/81; 381/92; 381/66

[58] Field of Search .................................... 340/550, 566, 340/541; 381/81, 92, 66

[56] References Cited

U.S. PATENT DOCUMENTS

| | | | |
|---|---|---|---|
| H1171 | 4/1993 | Fillhart et al. . | |
| 2,470,114 | 5/1949 | Sherwood et al. | 367/127 |
| 2,496,031 | 1/1950 | Anderson et al. | 381/81 |
| 3,588,803 | 3/1969 | Fleming | 4/7 |
| 3,715,577 | 2/1973 | Bohman | 367/117 |
| 3,805,260 | 4/1974 | Barowitz | 7/6 |
| 3,859,621 | 1/1975 | Foreman | 367/127 |
| 4,134,109 | 1/1979 | McCormick et al. | 340/550 |
| 4,489,442 | 12/1984 | Anderson et al. | 381/81 |
| 4,668,941 | 5/1987 | Davenport et al. | 340/550 |
| 4,837,558 | 6/1989 | Abel | 340/566 |
| 5,164,703 | 11/1992 | Rickman | 340/515 |

*Primary Examiner*—John K. Peng
*Assistant Examiner*—Albert K. Wong
*Attorney, Agent, or Firm*—Limbach & Limbach

[57] ABSTRACT

Dual microphones and a time-of-arrival processing circuit comprise a direction-sensing system which improves the false alarm immunity of an acoustic glass break detector by restricting its coverage to a well-defined zone. By comparing the arrival times of an abrupt sound at two spaced microphones, the processing circuit determines the direction of the sound. If the sound originated in the intended coverage zone, the processing circuit generates a signal which enables the glass break detector; otherwise, the detector is inhibited. When the improved glass break detector is oriented so that potential false alarm sources are outside the coverage zone, false alarm immunity is enhanced.

14 Claims, 10 Drawing Sheets

DIRECTION-SENSING ACOUSTIC GLASS BREAK DETECTING SYSTEM

TECHNICAL FIELD

The present invention relates to a direction sensing acoustic wave glass break detection system which can detect acoustic wave signals, representative of glass breaking from a preferred zone or volume of space, and more particularly to such a detection system which detects the acoustic wave signals from the preferred zone or volume, which is well defined.

BACKGROUND

A glass break detector is a common component of an intrusion detection system. Its purpose is to generate an alarm signal when glass is broken in an attempt to make entry into a room. In an acoustic glass break detector, the detection relies in whole or in part on airborne sound. Prior art acoustic glass break detectors use a single microphone in an electronic device which is mounted on a wall or ceiling within a specified distance from the protected glass. If the glass is broken the detector must generate an alarm signal. In addition, however, the detector ideally should not alarm when sounds from other sources are received. Such sounds may be produced by people or animals in the area, or by the normal operation of mechanical or electrical equipment, or by sounds generated outside the room, such as thunder or vehicles. Detectors use signal processing techniques such as spectral filtering and burst duration measurement to reject sounds from sources other than glass break. See, for example, U.S. Pat. No. 5,164,703, in which the detection algorithm requires the simultaneous presence of two bandpass frequencies. However, because many ordinary sounds are similar to the glass break signal, rejection of false alarms by means of signal processing is not perfect.

Since the glass to be protected is often located in one or two walls of the room, one method of improving false alarm immunity is to make the detector directional. It can then be installed so that the glass lies in the sensitive direction while a pan of the room containing potential false alarm sources lies in the insensitive direction. U.S. Pat. No. 4,837,558 attempts to take advantage of this principle by using a single microphone with inherent acoustic directionality. However, there are two problems with this approach. First, in normal rooms, sound undergoes reflections from the walls, ceiling, and floor. When a sound originates in the insensitive direction it will be reflected from walls in the sensitive direction. When the reflected sound arrives at the detector of U.S. Pat. No. 4,837,558 it is indistinguishable from sound that originated in the sensitive direction. Secondly, the acoustic directionality of the device in U.S. Pat. No. 4,837,558 is gradual and indefinite in limits. Some sensitivity is retained in all directions. A nearby sound from the insensitive direction may be received with the same amplitude as a distant sound from the sensitive direction. Furthermore, because the sensitivity of this device changes gradually with direction, it is difficult for an alarm installer to determine the true field of coverage of the device.

The use of microphone arrays and time-of-arrival processing to determine sound direction in fields other than acoustic glass break detection, is well known. For example, U.S. Pat. No. 3,859,621 describes an array of microphones and a processing system which produces a visual display of sound direction. Also, U.S. Pat. No. 3,715,577 describes an underwater microphone array and processing system which provides audible cues to a diver which allows the diver to determine the direction of an underwater acoustic beacon. Other prior art references in the acoustic wave detection art include, U.S. Pat. Nos. 2,470,114; 4,134,109; 4,489,442; 4,668,941; and 2,496,031; and U.S. Statutory Invention Registration H1171.

SUMMARY

In the present invention, an acoustic wave signal detector for detecting acoustic wave signals, representative of glass breakage, can distinguish acoustic wave signals from a preferred volume of space from acoustic wave signals from other volumes of space. The detector comprises a first sensor means for detecting a first acoustic wave signal and for generating a first electrical signal in response thereto. The detector also comprises a second sensor means for detecting a second acoustic wave signal and for generating a second electrical signal in response thereto. Finally, the detector comprises means for processing the first and second electrical signals for detecting the breakage of glass from the preferred volume of space. The processing means further comprises means for enabling the processing of the first electrical signal, in the event the first electrical signal precedes the second electrical signal, and inhibits the processing of the first electrical signal, in the event the second electrical signal precedes the first electrical signal.

Figure 2B:
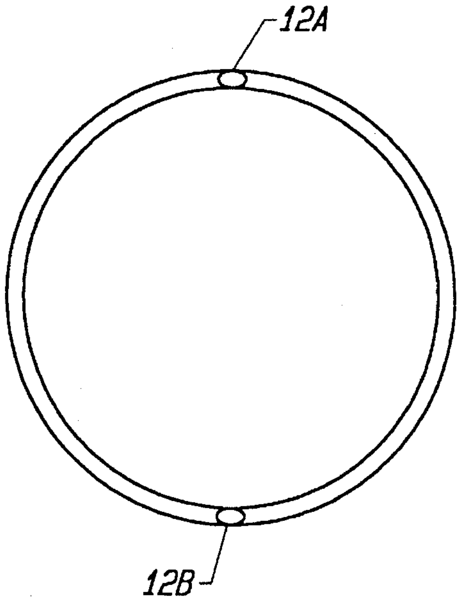

FIG. **2*a* is a pictorial view of one embodiment of an enclosure for the direction sensing acoustic glass break detection system of the present invention, with FIG. 2*b*** being an orthogonal projection view thereof.

Figure 1:
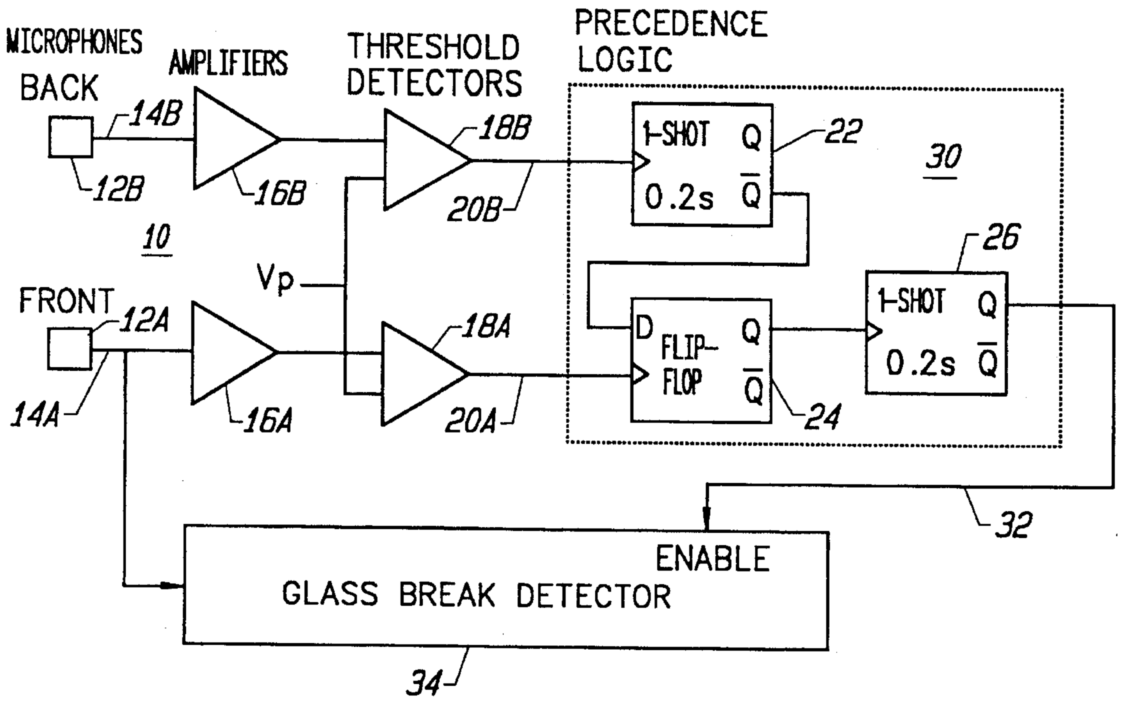
FIG. 1 is a block diagram of one embodiment of a direction-sensing acoustic glass breaking detection system of the present invention.
Figure 3:
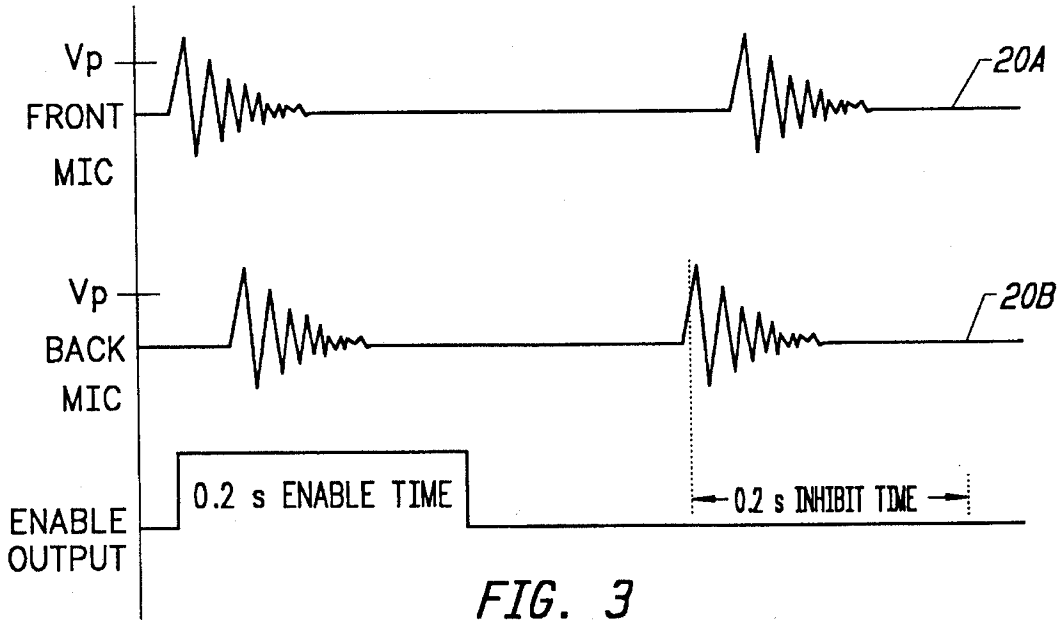

FIG. 3 is a timing diagram of the various electrical signals generated by the detection system shown in FIG. 1.

Figure 4:
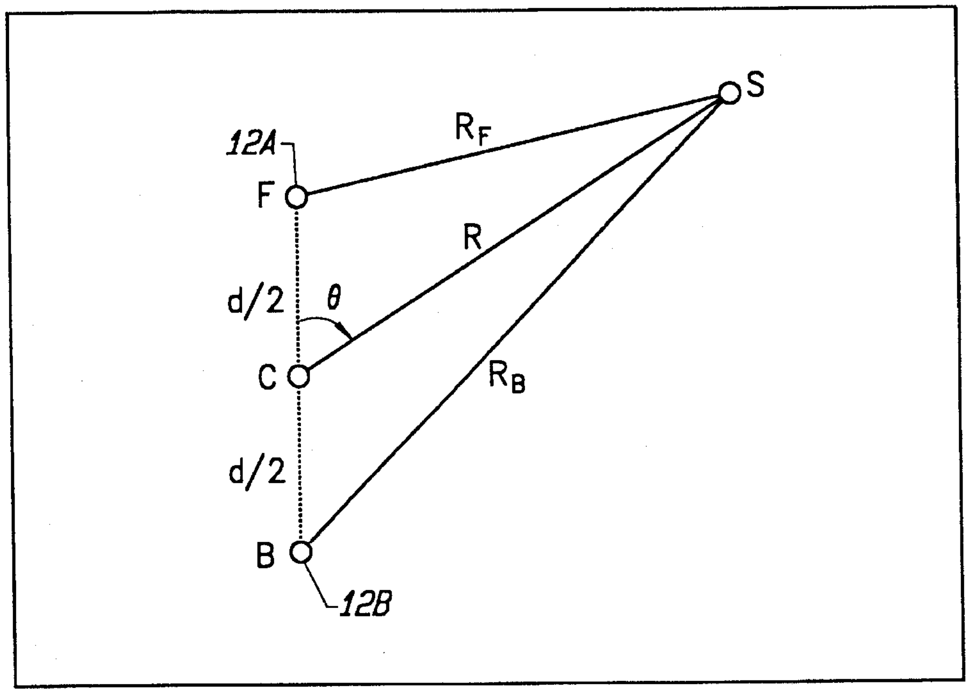

FIG. 4 is a schematic diagram showing the geometry used to analyze the time-of-arrival differences of acoustic waves at the microphones of the detection system of the present invention.

Figure 5:
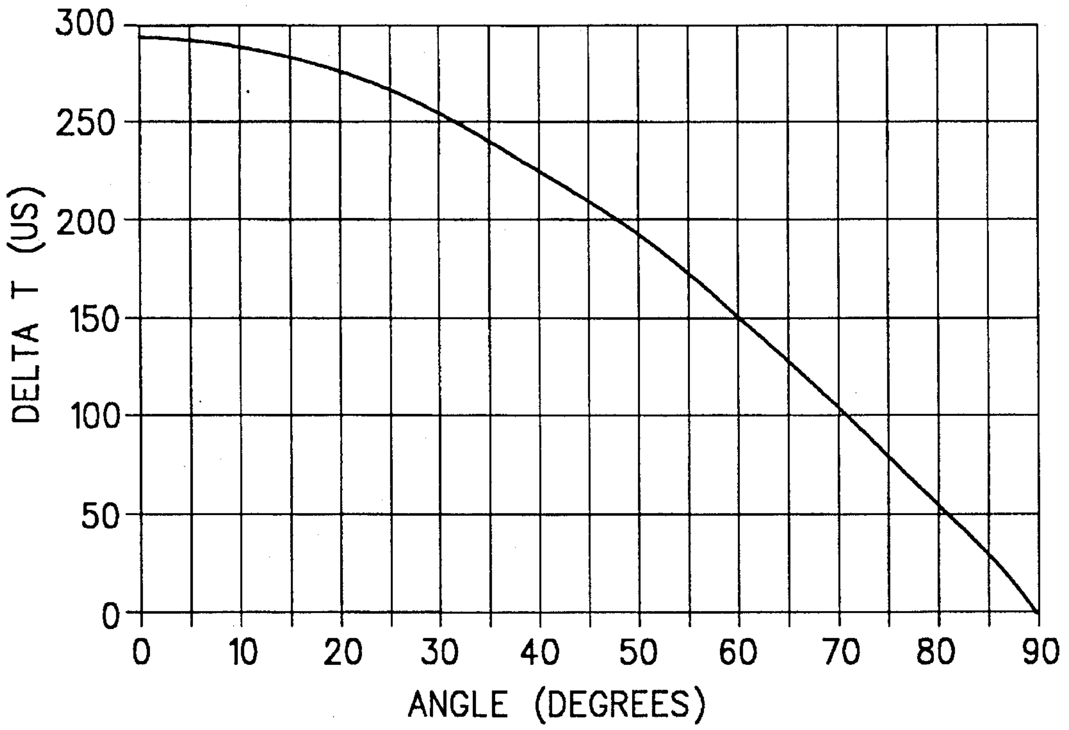

FIG. 5 is a graphical representation of time-of-arrival differences as a function of angle for a microphone spacing of four inches in the detection system of the present invention.

Figure 6:
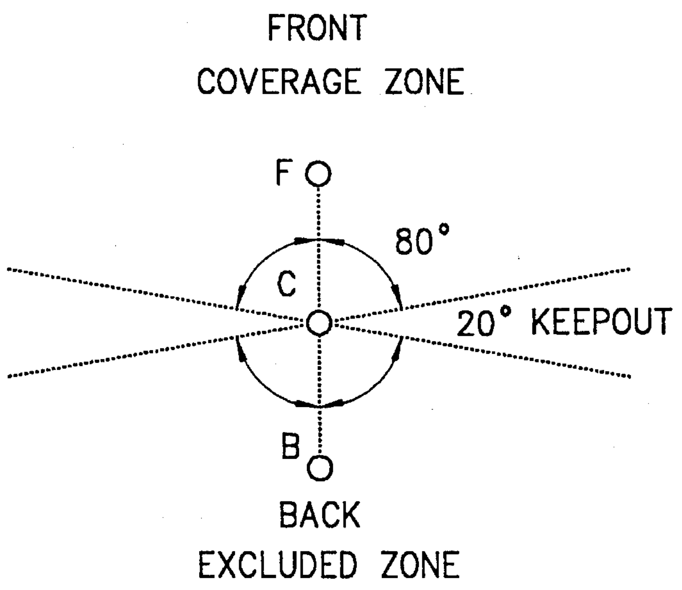

FIG. 6 shows the defined coverage and exclusion zones for the preferred embodiment of the detection system of the present invention.

Figure 7:
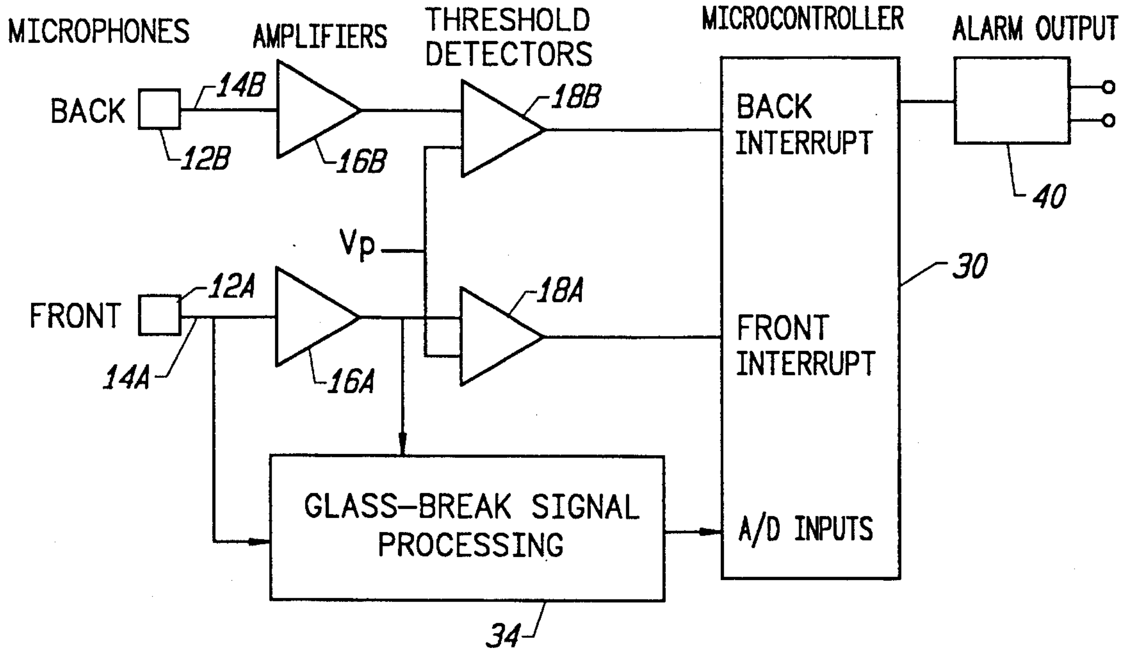
Figure 8A:
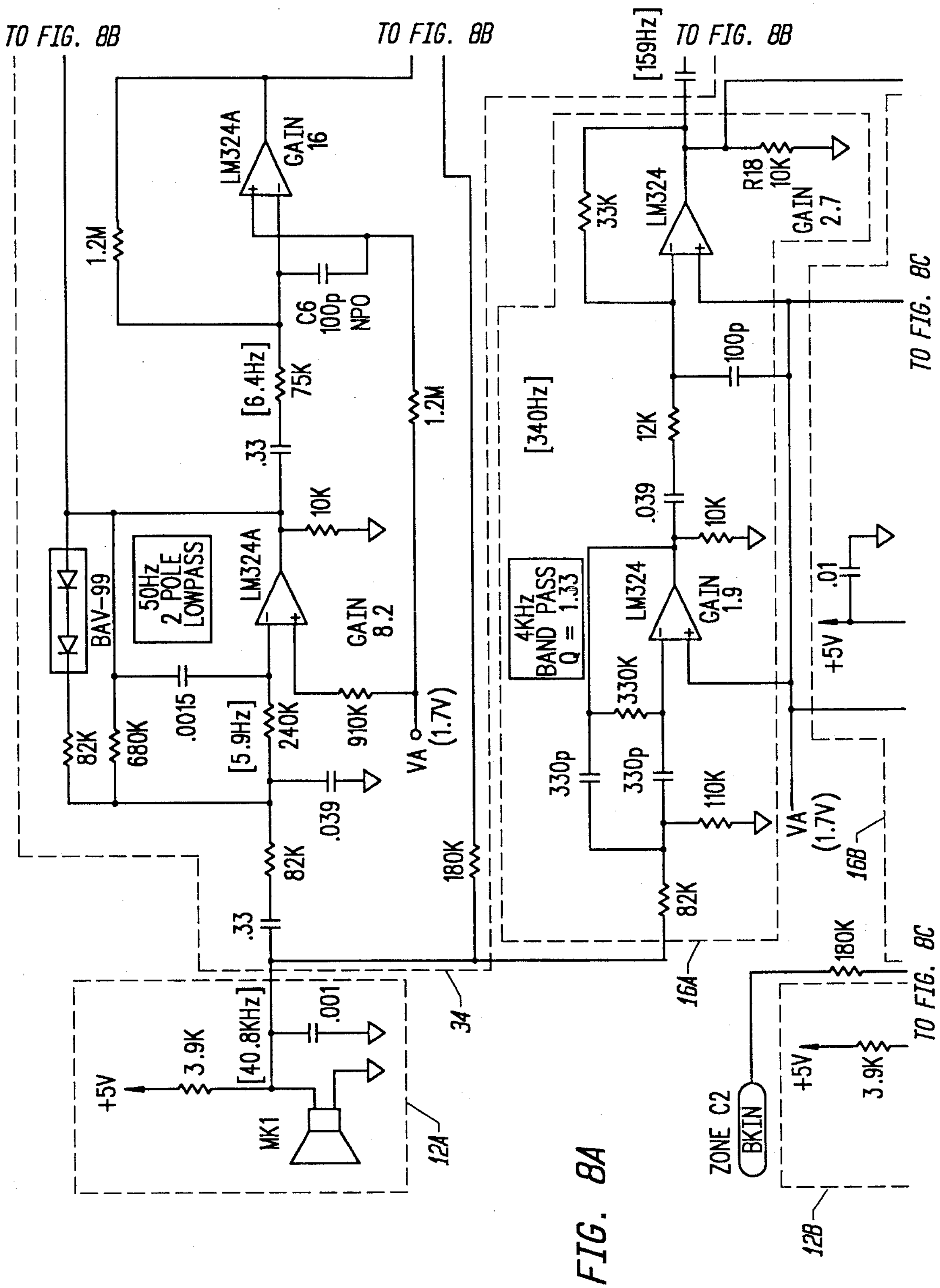
Figure 8B:
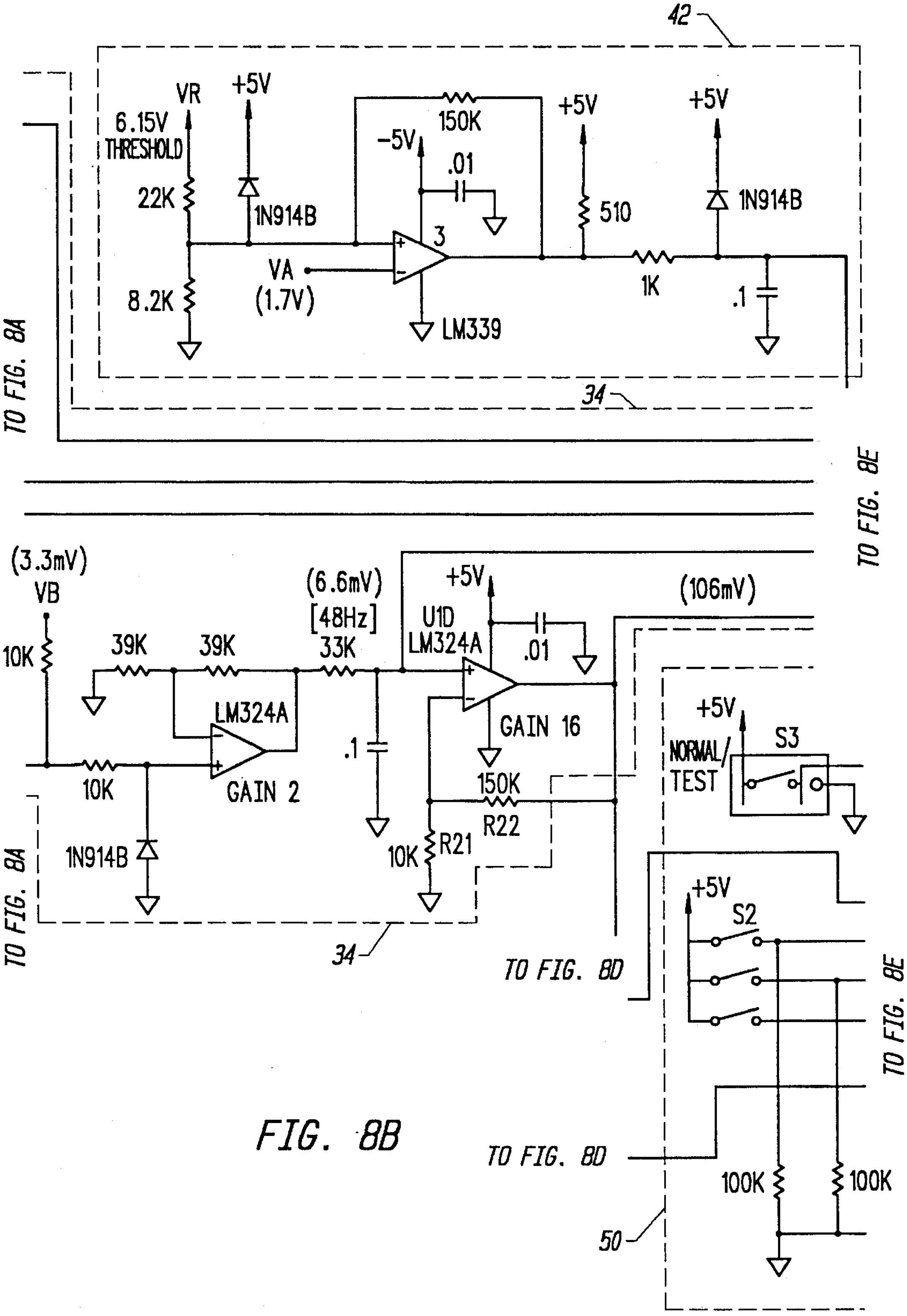
Figure 8C:
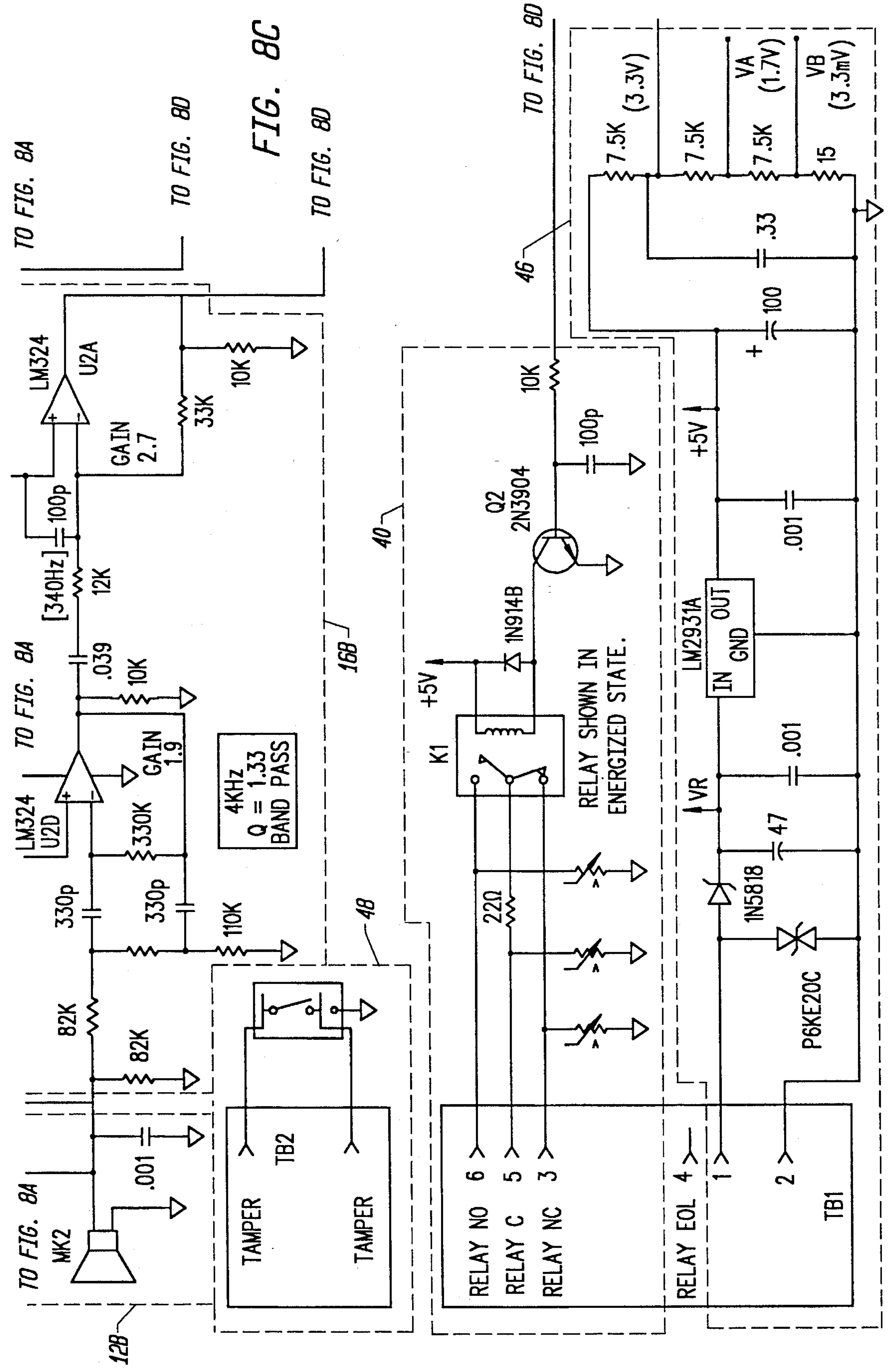
Figure 8D:
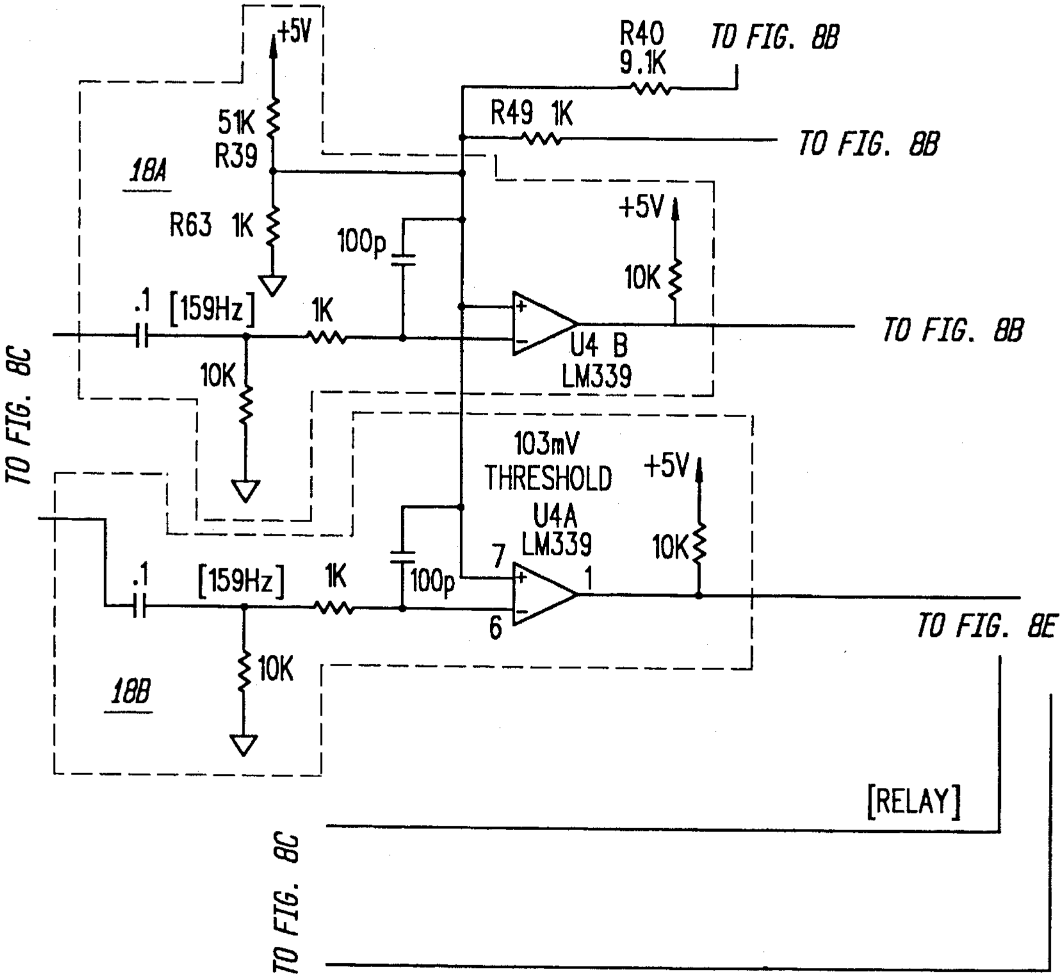
Figure 8E:
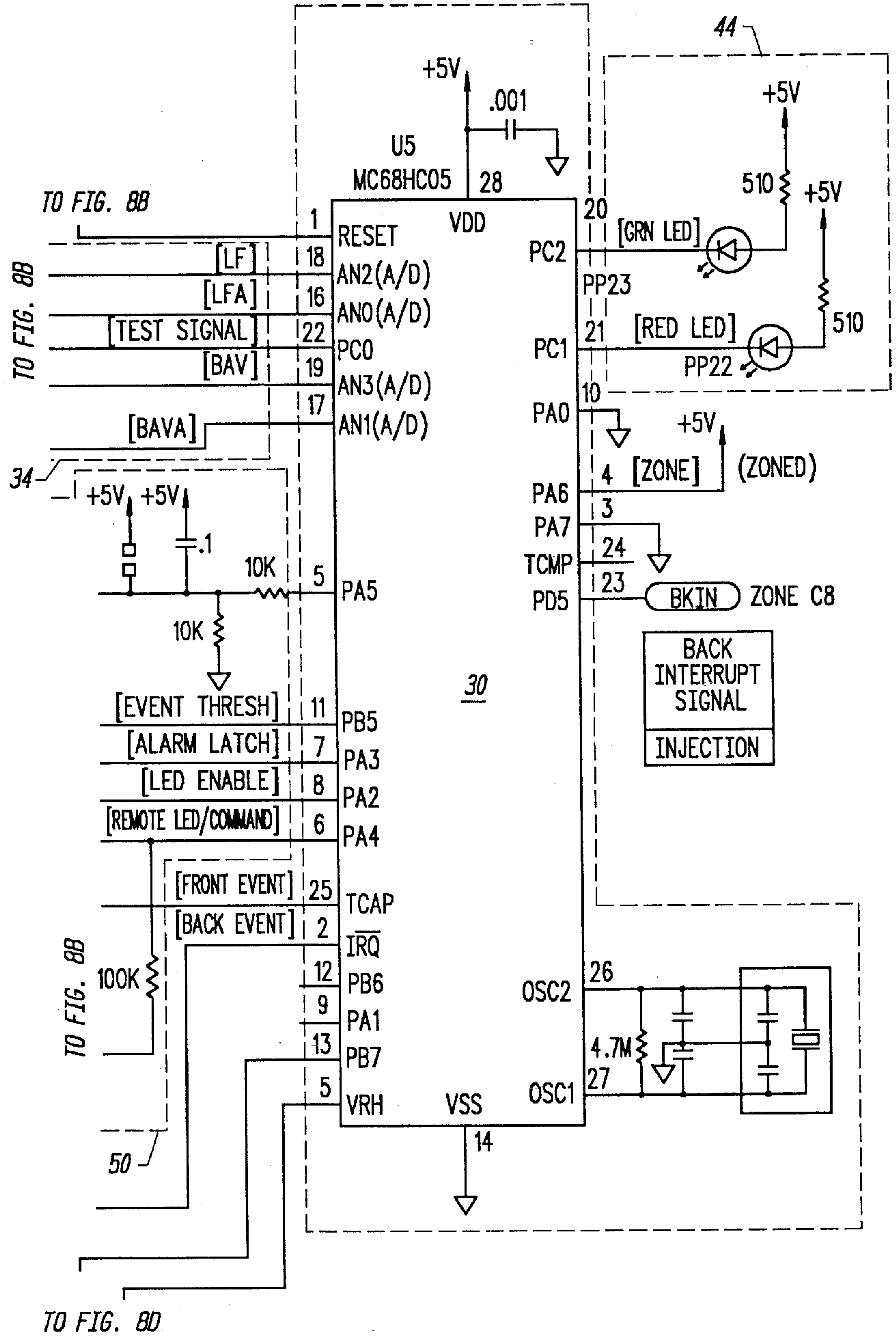

FIG. 7 is a block diagram of the preferred embodiment of the detection system of the present invention.

FIG. 8 is a detailed schematic diagram of the preferred embodiment shown in FIG. 7.

DETAILED DESCRIPTION OF THE PREFERRED EMBODIMENT

Referring to FIG. 1 there is shown a block diagram of a direction-sensing acoustic glass break detection system 10 of the present invention. Although the system 10 of FIG. 1 is not the preferred embodiment, it more clearly illustrates the principle of operation. The system 10 comprises two microphones: one of the two microphones **12*a* is "Front" and the other microphone 12*b*** is "Back".

When a sound wave arrives at the system 10, each of the microphones 12*a* and 12*b* converts the acoustic signal into an electrical signal 14*a* and 14*b*, respectively. One of the microphones 12*a* or 12*b*, which receives the earlier detected acoustic sound wave, would generate its corresponding electrical signal 14*a* or 14*b*. The other microphone 12*a* or 12*b* would generate its corresponding electrical signal 14*a* or 14*b* based upon the detection of the later arrived acoustic sound wave. The time difference between the two generated electrical signals 14*a* or 14*b* depends on the direction of the acoustic wave, impinging on the microphones 12*a* or 12*b*. As shown in FIG. 1, the electrical signal 14*a* or 14*b*, from each microphone 12*a* or 12*b* is amplified by a respective amplifier, 16*a* or 16*b*, and is applied to a threshold detector 18*a* or 18*b*, respectively. Each of the threshold detectors 18*a* and 18*b* is supplied with a threshold voltage $V_p$ and generates an output digital signal 20*a* or 20*b*, when the amplified electrical signal from the microphone 12*a* or 12*b* corresponds to the acoustic threshold P (discussed hereinafter), as represented by the threshold voltage signal $V_p$. A logic circuit 30 receives the digital signals 20*a* and 20*b*.

The logic circuit 30 comprises, in one embodiment, a first one shot 22 of 2 second in duration, for receiving the signal 20*b*. The output of the first one shot 22 is the $\overline{Q}$ output signal. The logic circuit 30 also comprises a flip-flop 24, which receives the signal 20*a*, and the $\overline{Q}$ signal from the first one shot 22. Finally, the output of the flip flop 24 is supplied to a second one shot 26, also of 0.2 second in duration, and generates an enable signal 32.

The logic circuit 30 determines which threshold detector 18*a* or 18*b* generated an output signal first. If the signal 20*a* from the Front microphone 12*a* occurred first, then the source of the sound is in the coverage zone and an enable signal 32 is generated, allowing the glass break detector circuit 34 to process the signal 14*a* from the "Front" microphone 12*a*. The duration of the enable signal 32 depends on the design of the glass break detector circuit 34. A duration of 0.2 seconds, as indicated in FIG. 1, is a typical value. If the "Back" microphone 12*b* generated the signal 20*b* first, then the source of the sound is outside the sensitive zone. In this case the processing circuit 30 does not generate the enable signal 32 and serves to prevent the glass break detector circuit for processing the signal 14*a* from the "Front" microphone 12*a* for a time duration of 0.2 seconds.

The timing relationships are illustrated in FIG. 3. As can be seen from FIG. 3, the electrical signals 14*a* and 14*b* would overlap, during a portion, irrespective of which microphone 12*a* or 12*b* received the acoustic wave first. In operation, if the "Front" microphone 12*a* received the acoustic wave first, the electrical signal 20*a* (if it exceeded the threshold $V_p$) would be generated before the electrical signal 20*b* would be generated. Therefore, the signal 20*a* would be stored in the edge triggered flip flop 24, before the first one shot is activated, generating the Q output. The Q output of the flip flop 24 is then supplied to the second one shot 26, to cause the enable signal to be generated for a duration of approximately 0.2 seconds. Since the signal 14*a* is also supplied to the glass break detector circuit 34, the enable signal 32 would enable the glass break detector circuit 34 for a duration of approximately 0.2 seconds. This timing relationship is shown in the first (i.e. left hand) portion of FIG. 3.

Figure 2A:
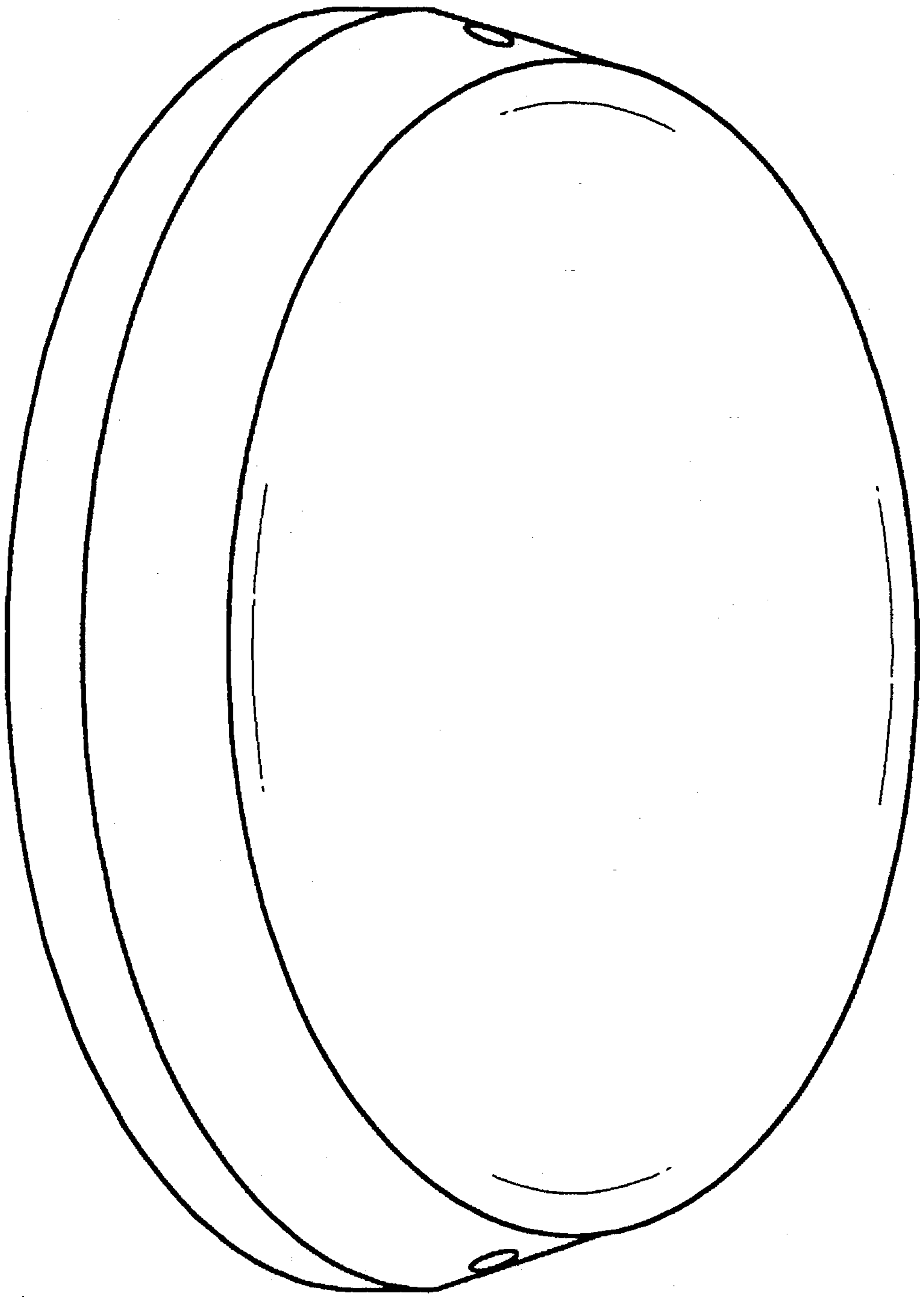

In the event the electrical signal from the "Back" microphone 12*b* is generated first, then (assuming the electrical signal 20*b* also exceeds the threshold $V_p$) the first one shot 22 would be activated. The $\overline{Q}$ output of the first one shot 22 is generated causing it to inhibit the flip flop 24 from being activatable. Thus, for a duration of approximately 0.2 seconds, the flip flop 24 cannot be set by the signal 20*a*. Therefore, in that event, the Q output of the flip flop 24 would be low. This would then inhibit the generation of the enable signal 32. The time period of 0.2 seconds is chosen so that it is longer then the time period of the electrical signal 14*a* or 14*b*. Thus, upon expiration of the 0.2 seconds from the first one shot 22, the logic circuit 30 would return back to "normal" operation, waiting to receive the signal 20*a*. It may be seen that without the inhibit duration, an electrical signal 14*a* generated by the "Front" microphone 12*a*, a short time after the electrical signal 12*b*, generated by the "Back" microphone 12*b*, could cause an enable signal 32 to be generated, which is not desired. The microphones 12*a* and 12*b* are housed in an enclosure which also contains the various described electronic circuits. A suitable enclosure allowing a microphone spacing of four inches is shown in FIG. 2.

The effect of this processing is to select sounds which are nearer in space to the Front microphone 12*a*. Sources located within a solid angle of approximately ±90 degrees from the central axis (with the apex located at the center point of a line between the microphones 12*a* and 12*b*) are included in the coverage zone. The geometry of the situation is shown in FIG. 4. This two-dimensional sketch represents the plane formed by S (the source), F (the Front microphone 12*a*), and B (the Back microphone 12*b*) in three-dimensional space. C is the centerpoint of a line between the microphones 12*a* and 12*b*. The difference in arrival times of sounds from sources in the sensitive zone can be calculated as follows. If the range from the source (S) to the centerpoint is R and the angle is θ, then:

$$R_F = \sqrt{R^2 + \frac{d^2}{4} - dR\cos\theta}$$

$$R_B = \sqrt{R^2 + \frac{d^2}{4} + dR\cos\theta}$$

where d is the spacing between the microphones 12*a* and 12*b*. The difference in arrival times at the two microphones is:

$$\Delta t = \frac{R_B - R_F}{c}$$

where c is the speed of sound in air, approximately equal to 1130 ft/sec (344 m/sec). FIG. 5 is a plot of Δt for angles from 0 to 90 degrees with a spacing of 4 inches between the microphones 12*a* and 12*b*. The value of range R has an insignificant effect.

In the simplest embodiment of the glass break detector circuit 34, it is allowed to process the sound if Δt is any positive value. Thus the coverage zone for this basic design is a hemispherical shell with a radius equal to the maximum specified range of the glass break detection system 10. However, since the detection system 10 is normally mounted on wall or ceiling surface, the effective zone is one-half this hemisphere.

For very small time differences of arrival, which occur for angles close to 90 degrees, the time-of-arrival differences are small, and there is some uncertainty in the system 10 due to variation in microphone sensitivity and variable delays in electronic processing. The angle at which delays become uncertain depends on the electronic design and the selected microphones. In the preferred embodiment this angle of uncertainty is determined to be 10 degrees. Consequently, the coverage and exclusion zones for the direction-sensing system 10 of the preferred embodiment are defined as ±80 degrees. The coverage and exclusion zones are illustrated in FIG. 6. The 20 degree "keepout" zones on each side are angular directions for which time-of-arrival discrimination is uncertain. In application, the system 10 is installed so that all protected glass falls within the coverage zone and all known false alarm sources fall within the exclusion zone. Neither glass nor known false alarm sources should be allowed in the keep-out zones.

A block diagram of the preferred embodiment is shown in FIG. 7 and a detailed schematic is shown in FIG. 8. In the interest of economy, some functions of the logic circuit 30 have been combined with those of the glass break detector circuit 34, and are implemented by a microcontroller.

With reference to the detailed schematic, the Front and Back microphones 12*a* and 12*b* are miniature electret devices with a frequency range of approximately 20 Hz to 20 kHz and a basic sensitivity of –62 dB re 1 V per microbar (at 1 kHz). The microphones 12*a* and 12*b* drive two identical bandpass amplifiers 16*a* and 16*b*, respectively. In the Back channel, the bandpass amplifier 16*b* is built around operational amplifiers U2D and U2A. Amplifier U2D implements an active filter with a center frequency of 4 kHz and a Q of 1.33. The gain of this active filter at 4 kHz is approximately unity. The output of the active filter is ac-coupled to the amplifier built around U2A. The gain of this amplifier U2A is approximately 2.8 over a frequency range of 340 Hz to 20 kHz. Thus the complete bandpass amplifier 16*b* has a gain of 2.8 at the center frequency of 4 kHz. This center frequency is chosen for the bandpass amplifier 16*b* because it is consistently present in glass break sounds for all types of glass and all conditions of room acoustics. It is thus an important feature for glass break detection and it can be relied on for time-of-arrival processing.

Following the bandpass amplifiers 16*a* and 16*b*, the signals in the Front and Back channels are ac-coupled to two identical threshold detectors 18*a* and 18*b*, respectively. In the Back channel, the threshold detector 18*b* is built around analog comparator U4A. The comparator threshold input at pin 7 is normally fixed at 0.02 V by resistors R39 (51K) and R63 (1K). Taking into account the sensitivity of the microphones and the response of the bandpass amplifier, this voltage corresponds to the acoustic peak pressure threshold P (discussed hereinafter). It will be noted that two other signals are connected to pin 7 of U4A in a way that will allow the threshold voltage to be modified. Neither of these signals is essential to the direction-sensing function, but they will be briefly described. The connection of amplifier U1D through R40 (9.1K) allows a sample of the detected audio signal in the glass break signal processing circuit 34 to increase the threshold when large, continuous signals are detected. This connection reduces the sensitivity of the system 10 to continuous or slowly increasing sounds, which are not characteristic of glass breakage. The connection of microcontroller U5 through R49 (1K) allows the microcontroller 30 to reduce the threshold under software control. Threshold reduction is used in test mode to calibrate the system 10 so that an external glass break simulator can accurately indicate effective range.

The microcontroller 30 in this system 10 is interrupt-driven. It is essentially idle until an external event triggers glass break detector processing. The external events are the outputs of the Front and Back Threshold Detectors 18*a* and 18*b*. The logic and timing are the same as that illustrated in the basic system 10 of FIG. 1, but are implemented in the microcontroller software. The method of programming the microcontroller 10 to produce the required logic and timing will be obvious to one skilled in the art.

The threshold detectors 18*a* and 18*b* connect to the microcontroller 30 at pins 2 and 25. Each of these inputs functions as an external interrupt, sensitive to transitions from a high logic level (approximately +5 V) to a low level (approximately 0 V). Pin 2 may be considered the Back interrupt (since it originates from the "Back" microphone 12*b*) and pin 25 the Front interrupt. Software in the microcontroller 30 responds to whichever interrupt occurs first in time. If the Back interrupt occurs first, then the microcontroller 30 will not respond to Front interrupts for 0.2 seconds, and will not process glass signals during this time. Continuing Back interrupts may extend the inhibit duration. However, if a Front interrupt occurs while the microcontroller 30 is not inhibited, then it will immediately process the signals presented to its analog-to-digital converter inputs (Pins 16–19 from the processing circuit 34) and decide whether an alarm condition is qualified.

The processing circuit 34 processes the signal from the Front microphone 12*a* to extract information used by the microcontroller 30 to determine if a sound in the coverage zone is characteristic of glass breakage. The processed signals are applied to the microcontroller 30 through four analog-to-digital inputs, supplied at pins 16–19 of the microcontroller 30.

The remainder of the circuit blocks are associated with the glass break detection function and are not essential to the direction-sensing system. They are briefly described here.

Circuit block 40 is the final alarm output. If the microcontroller 30 determines that all alarm conditions are satisfied, it places a low logic level on normally-high pin 13, which turns off transistor Q2. This action de-energizes the relay, which constitutes an alarm condition.

Circuit block 42 is a power-up reset circuit. It holds the microcontroller 30 in reset until the input supply voltage has reached a satisfactory level, and forces a reset if the supply voltage drops below that level.

Circuit block 44 is a pair of indicator LED's used to indicate status of the system 10, including detection of a sound in the coverage zone, alarm, trouble, and test mode.

Circuit block 46 is the input supply voltage regulator and filter. It also includes voltage dividers which reference voltages for use at various points in other circuit blocks.

Circuit block 48 is tamper-indicating switch which is activated when the cover of the device is opened.

Circuit block 50 contains configuration and mode select switches.

Theoretical Basis of the Present Invention

The glass break signal is an impulsive sound with a high peak amplitude and a relatively short duration. Research has established a certain minimum amplitude for the peak based on the worst case detection problem, including the effect of range from the glass. This minimum amplitude constitutes an acoustic peak pressure threshold, P. P of course is specified within a certain measurement bandwidth appropriate to the microphone and amplifier system which will be used in the detector. All sounds below P can be ignored. All sounds exceeding P must be tested further to determine whether the source is glass break.

Because P is a relatively high value, sounds achieving this threshold from sources other than glass break are infrequent in typical application environments. Sounds with amplitudes exceeding P are usually impulsive in nature, caused by impact or explosive sources. When such a sound is generated, the first part to be received at a detector (except under unusual circumstances) is the "direct wave," which is the sound traveling direct from the source to the detector. The direct wave is then followed by secondary waves reflected from room surfaces. Because the direct wave travels a shorter distance than reflected waves and does not undergo attenuating reflections, it has higher amplitude than reflected waves and is more likely to exceed the P threshold than reflected waves. The direct wave can thus be distinguished from reflected waves by virtue of the fact that it is the first to arrive at the detector, and also the first part of the sound to exceed the P threshold. Because the direct wave travels straight from the source to the detector, it contains sufficient information to identify the direction of the source. The direction-sensing system 10 of the present invention operates by sensing and analyzing the direct wave.

In order to capture the directional information in the direct wave, the direction-sensing system 10 uses two microphones spaced a short distance apart. The spacing of the microphones determines the magnitude of the time-of-arrival difference for a wave impinging on the system 10. If the spacing is too close the time differences may be too small to be distinguished by the processing circuit, while if the spacing is too wide, the enclosure becomes unacceptably large for application as an intrusion sensor. A spacing of two to six inches is a satisfactory compromise.

Refinements

This section describes some improvements to the basic system.

1. In the discussion of the basic system it is assumed that the microphones 12*a* and 12*b* have equal sensitivity in all directions. If they do not, then for sounds very close to the P threshold, one threshold detector may respond while the other does not. In a practical device it would be necessary to match or adjust the microphones to achieve equal sensitivity. However, the need for matching is greatly reduced if the microphones have directional sensitivity in the desired direction. Such directionality can be achieved by various means, such as by mounting the microphones flush with the enclosure surface and pointing them in the appropriate directions. Providing a directional characteristic in the desired direction insures that for marginal sounds the microphone pointed toward the sound will be more likely to trip its threshold detector. This result in turn will insure that the direction will be sensed correctly.
2. It would be possible to "mask" the basic direction-sensing system, intentionally or unintentionally, by subjecting it to loud, continuous sound exceeding the P threshold. To prevent masking, the processing logic can include an additional function which overrides the inhibit and enables the glass break detector if inhibiting exceeds a certain duration, perhaps one second. In this event the processor simply defaults to the false alarm rejection of the glass break detector.
3. The basic direction-sensing system tests the Front and Back signals only for precedence, which produces a hemispherical coverage zone. However, if the processor has means to determine the actual delay between the signals, a variety of coverage zones can be made available to the user. As examples, the sensitive zone selection could include a 90 degree solid angle, a hemisphere, a 270 degree solid angle, and a sphere with 90 degree coring at opposite ends. With a selection of sensitive zones available, the detector could be programmed at time of installation for optimum coverage.

From the foregoing, it can be seen that the system 10 of the present invention has many advantages over the prior art. Thus, with the system of the present invention, the problems of U.S. Pat. No. 4,837,558 are overcome. Finally, it should be stressed that the direction-sensing system 10 may be used in combination with a glass break detector of any design. The only constraint on the glass break detection circuit is that it must offer an input which inhibits alarms for a given logic level.

What is claimed is:

1. A glass break detection device for detecting acoustic wave signals, representative of glass breakage, from a preferred direction, said device comprising:

a first sensor means in a first location, said first sensor means being sensitive to sound in a specified frequency range, for detecting a first acoustic wave signal and for generating a first electrical signal in response thereto;

a second sensor means in a second location spaced from said first location, said second sensor means being sensitive to sound in said specified frequency range, for detecting a second acoustic wave signal, and for generating a second electrical signal in response thereto; and means for processing said first and second electrical signals for detecting the breakage of glass from the preferred direction, wherein said preferred direction is a function of the first and second locations, and wherein said processing means further comprises means for enabling the processing of said first electrical signal, in the event said first electrical signal precedes said second electrical signal, and for inhibiting the processing of said first electrical signal, in the event said first electrical signal does not precede said second electrical signal.

2. The device of claim 1 further comprising:

a first amplifier means for receiving said first electrical signal and for generating a first amplified electrical signal;

a second amplifier means for receiving said second electrical signal and for generating a second amplified electrical signal; and wherein said processing means processes said first and second amplified electrical signals.

3. The device of claim 2 further comprising:

threshold detecting means for receiving said first and second amplified electrical signals and for supplying same to said processing means in the event said first and second amplified electrical signals exceed a threshold signal.

4. The device of claim 3 wherein said threshold signal is representative of the breakage of glass.

5. The device of claim 1 wherein each of said first sensor means and said second sensor means is a microphone.

6. The device of claim 5 wherein each of said first and second microphones has the same sensitivity.

7. The device of claim 1 wherein said processing means inhibits for a period of time, the processing of said first electrical signal, in the event said second electrical signal precedes said first electrical signal.

8. A method of detecting acoustic wave signals, representative of glass breakage, from a preferred direction, said method comprising:

detecting at a first location a first acoustic wave signal within a specified frequency range and generating a first electrical signal in response thereto;

detecting at a second location spaced from said first location a second acoustic wave signal within said specified frequency range, and generating a second electrical signal in response thereto;

processing said first and second electrical signals to determine acoustic wave signals from the preferred direction, wherein said preferred direction is a function of the first and second locations, wherein said processing step comprising:

enabling the processing of said first electrical signal in the event said first electrical signal precedes said second electrical signal; and inhibiting the processing of said first electrical signal, in the event said first electrical signal does not precede said second electrical signal;

wherein said first electrical signal is representative of acoustic wave signal from the preferred volume of space.

9. The method of claim 8 wherein said processing step determines an amount of delay time between said first and second electrical signals.

10. The method of claim 9 further comprising comparing the amount of delay time to a threshold value; and enabling the processing of said first electrical signal in the event said amount of delay time exceeds said threshold value.

11. The method of claim 8 further comprising:

comparing said first electrical signal to a threshold signal and processing same in the event said first electrical signal exceeds the threshold; and comparing said second electrical signal to a threshold signal and processing same in the event said second electrical signal exceeds the threshold.

12. The method of claim 8 further comprising:

amplifying said first electrical signal to produce a first amplified electrical signal;

amplifying said second electrical signal to produce a second amplified electrical signal; and wherein said processing step processes said first and second amplified electrical signals.

13. A direction sensitive acoustic detection device for detecting acoustic wave signals, representative of glass breakage, from a preferred zone, said device comprising:

sensor means for detecting at a plurality of spaced apart locations, a plurality of acoustic wave signals within a specified frequency range and for generating a plurality of electrical signals in response thereto, said plurality of acoustic wave signals originating from a single source; and means for processing said plurality of electrical signals to determine the difference in time of detection between the plurality of electrical signals and for determining the direction of said single source as a function of the difference in time of detection between the plurality of electrical signals and the plurality of spaced apart locations, and to generate an alarm signal in the event said direction of said single source is in the preferred direction, wherein said processing means further comprising means for inhibiting the processing of all of said plurality of electrical wave signals in the event one or more of said electrical wave signals precede a selected electrical wave signal.

14. The device of claim 1 wherein said means for enabling enables processing of said first electrical signal for a specified duration immediately following detection of said first acoustic wave signal.

* * * * *